(12) United States Patent
Naruse

(10) Patent No.: US 10,598,136 B2
(45) Date of Patent: Mar. 24, 2020

(54) CLOGGING DEGREE ESTIMATION APPARATUS

(71) Applicant: KABUSHIKI KAISHA TOYOTA JIDOSHOKKI, Kariya-shi, Aichi-ken (JP)

(72) Inventor: Yuya Naruse, Kariya (JP)

(73) Assignee: KABUSHIKI KAISHA TOYOTA JIDOSHOKKI, Toyota-shi, Aichi-ken (JP)

( * ) Notice: Subject to any disclaimer, the term of this patent is extended or adjusted under 35 U.S.C. 154(b) by 136 days.

(21) Appl. No.: 15/850,774

(22) Filed: Dec. 21, 2017

(65) Prior Publication Data

US 2018/0179998 A1    Jun. 28, 2018

(30) Foreign Application Priority Data

Dec. 22, 2016  (JP) .................................. 2016-248627

(51) Int. Cl.
| | |
|---|---|
| *F02M 35/09* | (2006.01) |
| *F01N 9/00* | (2006.01) |
| *F01N 11/00* | (2006.01) |
| *B01D 46/00* | (2006.01) |
| *F02D 41/00* | (2006.01) |

(52) U.S. Cl.
CPC ............ *F02M 35/09* (2013.01); *F01N 9/002* (2013.01); *F01N 11/002* (2013.01); *B01D 46/0086* (2013.01); *F01N 2900/0422* (2013.01); *F02D 41/0055* (2013.01); *F02D 41/0072* (2013.01)

(58) Field of Classification Search
CPC ....... F02M 35/09; F01N 9/002; F01N 11/002; F01N 2900/0422; F02D 41/0072; F02D 41/0055; B01D 46/0086
See application file for complete search history.

(56) References Cited

U.S. PATENT DOCUMENTS

| | | | |
|---|---|---|---|
| 7,509,845 B2 * | 3/2009 | Wiggins | B01D 46/0086 73/114.31 |
| 7,591,173 B2 * | 9/2009 | Benscoter | B01D 46/0086 73/114.33 |
| 8,181,449 B2 * | 5/2012 | Onodera | B01D 46/0061 60/295 |

(Continued)

FOREIGN PATENT DOCUMENTS

| | | |
|---|---|---|
| EP | 1 832 727 A2 | 9/2007 |
| EP | 2 557 305 A2 | 2/2013 |

(Continued)

*Primary Examiner* — Freddie Kirkland, III
(74) *Attorney, Agent, or Firm* — Sughrue Mion, PLLC

(57) ABSTRACT

A clogging degree estimation apparatus includes an information acquisition unit configured to acquire information indicating a vehicle's traveling status for each predetermined travel section, a coefficient determination unit configured to determine a clogging coefficient K based on the traveling status indicated by the information for each travel section, and a clogging degree calculator configured to calculate an increase in clogging degree based on the product of the clogging coefficient K and a distance of the travel section for each travel section and calculate, as the clogging degree, an integrated value of the increase in clogging degree calculated for each travel section.

12 Claims, 5 Drawing Sheets

(56) References Cited

U.S. PATENT DOCUMENTS

| | | | |
|---|---|---|---|
| 8,701,473 B2* | 4/2014 | Uehara | B01D 46/0086 73/114.31 |
| 9,739,244 B2* | 8/2017 | Dudar | F02M 35/09 |
| 2002/0103583 A1 | 8/2002 | Ohmura et al. | |
| 2009/0082938 A1 | 5/2009 | Onodera et al. | |
| 2013/0036804 A1 | 2/2013 | Uehara | |
| 2016/0068077 A1 | 3/2016 | Smith et al. | |

FOREIGN PATENT DOCUMENTS

| | | |
|---|---|---|
| JP | 59-83144 U | 6/1984 |
| JP | 2002-228552 A | 8/2002 |
| JP | 2006-021570 A | 1/2006 |
| JP | 2006-088751 A | 4/2006 |
| JP | 2007-23874 A | 2/2007 |
| JP | 2007-321673 A | 12/2007 |
| JP | 2013-036382 A | 2/2013 |

* cited by examiner

| AREA | APPLICABLE PERIOD | SECOND COEFFICIENT |
|---|---|---|
| AREA A | ENTIRE PERIOD | 1.1 |
| AREA B | ENTIRE PERIOD | 1.3 |
| ⋮ | ⋮ | ⋮ |
| AREA C | DECEMBER THROUGH MARCH | 1.2 |

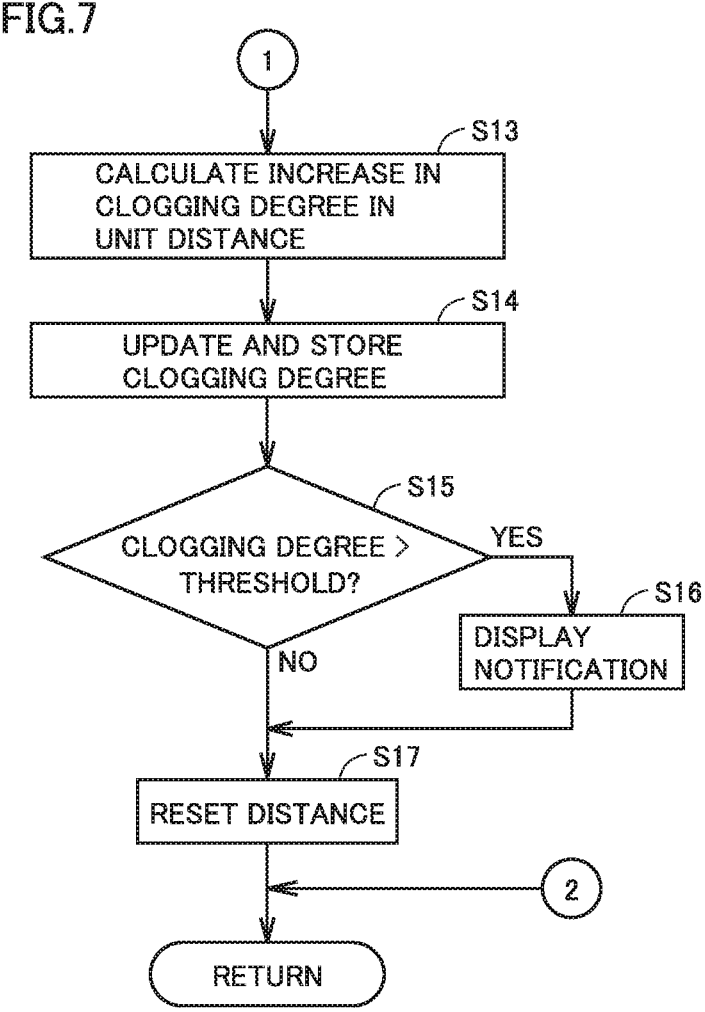

US 10,598,136 B2

CLOGGING DEGREE ESTIMATION APPARATUS

This nonprovisional application is based on Japanese Patent Application No. 2016-248627 filed on Dec. 22, 2016 with the Japan Patent Office, the entire contents of which are hereby incorporated by reference.

BACKGROUND OF THE INVENTION

Field of the Invention

The present invention relates to a clogging degree estimation apparatus that estimates a clogging degree of an air cleaner that filters the air sucked into an engine.

Description of the Background Art

Japanese Patent Laying-Open No. 2006-88751 discloses, as a conventional apparatus that shows a time for replacement of an air cleaner, a guidance display apparatus that estimates a time for replacement of an air cleaner based on a past average travel distance and shows the replacement time.

Japanese Patent Laying-Open No. 2013-36382 discloses an apparatus that estimates the life of an air cleaner based on a pressure value detected by a pressure detector provided downstream of the air cleaner.

Air cleaners differ from one another in clogging degree depending on a traveling status of a vehicle. For example, the clogging degree becomes higher when the vehicle is traveling in an area with the air containing a large amount of dust or dirt. The technology described in Japanese Patent Laying-Open No. 2006-88751 estimates a time for replacement by taking into account a travel distance alone and does not take into account a vehicle's traveling status. For a vehicle that frequently travels in the area with the air containing a large amount of dust or dirt, thus, the guidance display apparatus may fail to show a time for replacement even when an actual clogging degree of the air cleaner indicates that the air cleaner should be replaced. In such a case, the performance of the engine may degrade or the engine may be damaged due to excessive deterioration of the air cleaner.

Although the technology disclosed in Japanese Patent Laying-Open No. 2013-36382 detects a pressure correlated with an actual clogging degree of the air cleaner to detect a clogging degree with high accuracy, it needs a pressure detector, which may result in a cost increase.

SUMMARY OF THE INVENTION

The present invention has been made to solve the above problem, and an object thereof is to provide a clogging degree estimation apparatus that enables an accurate estimation of a clogging degree of an air cleaner while controlling a cost increase.

A clogging degree estimation apparatus according to an aspect of the present invention estimates a clogging degree of an air cleaner mounted on a vehicle. The clogging degree estimation apparatus includes an information acquisition unit configured to acquire information indicating a traveling status of a vehicle for each predetermined travel section, a coefficient determination unit configured to determine a clogging coefficient based on the traveling status indicated by the information for each predetermined travel section, and a clogging degree calculator configured to calculate an increase in clogging degree based on the product of the clogging coefficient and a distance of the predetermined travel section and calculate, as the clogging degree, an integrated value of the increase calculated for each predetermined travel section.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIG. 7 is a flowchart showing a latter stage of the processing flow of the clogging degree estimation apparatus.

DESCRIPTION OF THE PREFERRED EMBODIMENTS

An embodiment of the present invention will now be described with reference to the drawings. Identical or equivalent parts and components are identically noted in the description below. Their names and functions are also identical. The detailed description thereof will accordingly not be repeated.

Configuration of Engine

Figure 1:
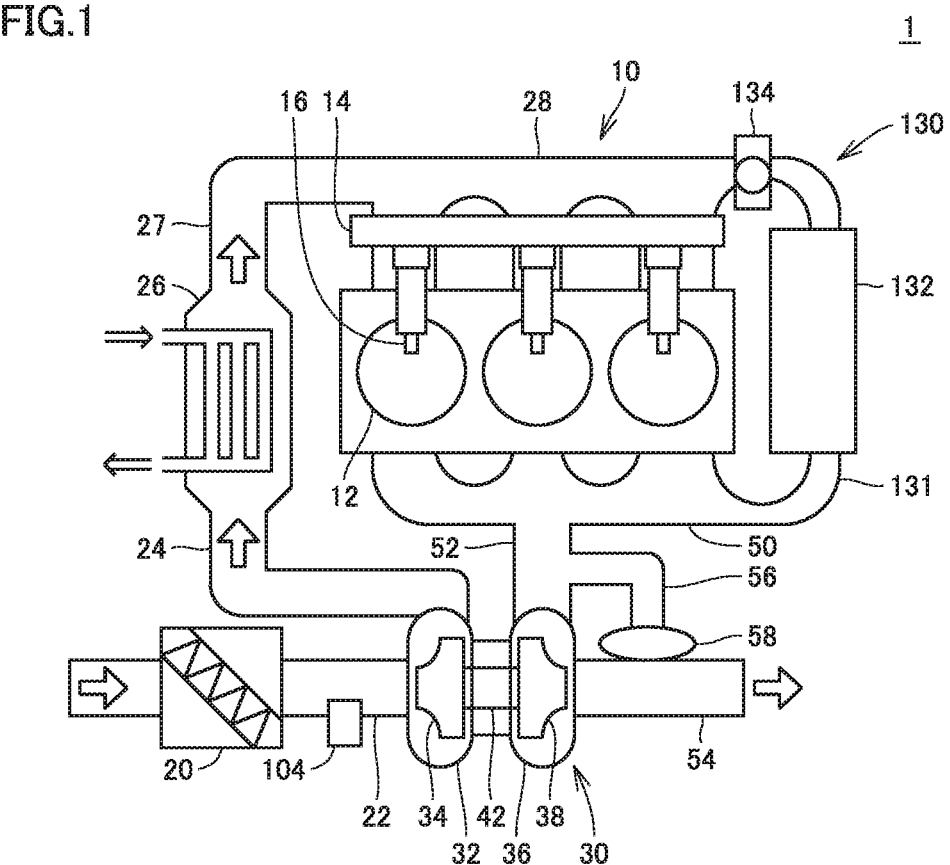
FIG. 1 shows a schematic configuration of an engine including an air cleaner whose clogging degree is estimated by a clogging degree estimation apparatus according to an embodiment.

FIG. 1 shows a schematic configuration of an engine 1 including an air cleaner whose clogging degree is estimated by a clogging degree estimation apparatus according to an embodiment.

The engine 1 is an internal-combustion engine to be mounted on a vehicle, and includes an engine body 10, an air cleaner 20, an intercooler 26, an intake manifold 28, a supercharger 30, and an exhaust manifold 50.

The engine body 10 includes a plurality of cylinders 12, a common rail 14, and a plurality of injectors 16. Although the present embodiment describes an in-line-3 diesel engine as an example of the engine 1, the engine 1 may be an engine having any other cylinder layout (e.g., V-shaped or horizontal layout) or a gasoline engine.

Each of the plurality of injectors 16 is provided to a corresponding one of the plurality of cylinders 12 and is connected to the common rail 14. Fuel stored in a fuel tank (not shown) is pressurized to a predetermined pressure and is then supplied to the common rail 14. The fuel supplied to the common rail 14 is sprayed from each of the plurality of injectors 16 at predetermined timing.

The air cleaner 20 captures foreign matter in the air sucked in from the outside of the engine 1 to remove the foreign matter from the sucked air. Non-limiting examples of the foreign matter to be removed by the air cleaner 20 include dust, dirt, and sand. The air cleaner 20 is connected to one end of an intake pipe 22.

The other end of the intake pipe 22 is connected to an inlet of a compressor 32 of the supercharger 30. An outlet of the compressor 32 is connected to one end of an intake pipe 24.

The other end of the intake pipe 24 is connected to one end of the intercooler 26. The intercooler 26 has a configuration including a water-cooled heat exchanger that cools the air that flows through the intake pipe 24. Alternatively, the intercooler 26 may have a configuration including an air-cooled heat exchanger.

The other end of the intercooler 26 is connected to one end of an intake pipe 27. The other end of the intake pipe 27 is connected to the intake manifold 28. The intake manifold 28 is coupled to an intake port of each of the plurality of cylinders 12 of the engine body 10.

The air sucked into the engine 1 is filtered by the air cleaner 20. The air filtered by the air cleaner 20 is compressed by the compressor 32 and is then cooled by the intercooler 26. The air cooled by the intercooler 26 passes through the intake manifold 28 connected to the intake side of each of the cylinders 12 of the engine body 10 and is then sucked into the cylinders 12 of the engine body 10.

The exhaust manifold 50 is coupled to an exhaust port of each of the plurality of cylinders 12 of the engine body 10. The exhaust manifold 50 is connected to one end of a first exhaust pipe 52. The other end of the first exhaust pipe 52 is connected to a turbine 36 of the supercharger 30. Accordingly, an exhaust gas discharged from the exhaust port of each of the cylinders 12 is collected by the exhaust manifold 50 and is then supplied to the turbine 36 through the first exhaust pipe 52.

The engine 1 further includes an exhaust gas recirculation (EGR) device 130. The EGR device 130 includes an EGR passage 131 connecting the intake manifold 28 and the exhaust manifold 50, and an EGR valve 134 and an EGR cooler 132 provided partway along the EGR passage 131. The EGR device 130 is a device that adjusts the degree of opening of the EGR valve 134 and introduces part of an exhaust gas into the intake air to lower the combustion temperature in a combustion chamber, thereby restricting the generation of $NO_x$.

The supercharger 30 includes the compressor 32 and the turbine 36. The turbine 36 is connected to one end of a second exhaust pipe 54. An exhaust gas discharged from the turbine 36 is discharged out of the vehicle through the second exhaust pipe 54. A compressor wheel 34 is housed inside a housing of the compressor 32, and a turbine wheel 38 is housed in a housing of the turbine 36. The compressor wheel 34 and the turbine wheel 38 are coupled to each other by a coupling shaft 42 and rotate together. The compressor wheel 34 is thus rotationally driven by exhaust energy of the exhaust gas supplied to the turbine wheel 38.

When rotationally driven by the turbine wheel 38, the compressor 32 supercharges the intake air upstream of the compressor 32 (hereinafter referred to as "pre-supercharge intake air") and supplies it to the intake pipe 24. The pressure of the intake air downstream of the compressor 32 (hereinafter referred to as "post-supercharge intake air") is made higher than the pressure of the pre-supercharge intake air.

If an inflow of an excess amount of exhaust gas into the turbine 36 needs to be prevented, the exhaust gas passes through an exhaust bypass passage 56 by a wastegate valve 58 opened. The exhaust gas, which has passed through the exhaust bypass passage 56, bypasses the turbine 36 and is guided to the second exhaust pipe 54.

The engine 1 includes an airflow meter 104. The airflow meter 104 detects a flow rate of the pre-supercharge intake air in the intake pipe 22.

Clogging Degree Estimation Apparatus and its Peripheral Components

Figures 2, 3:
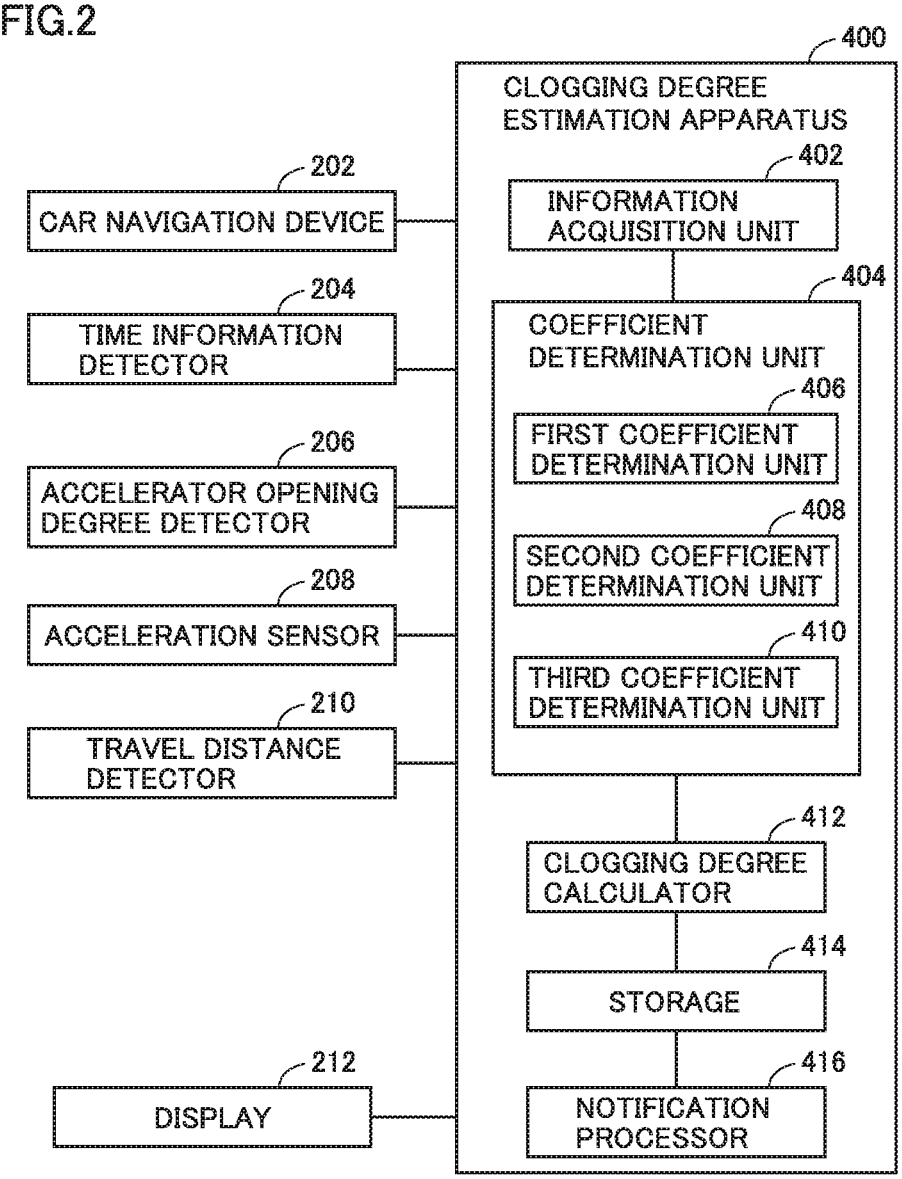
FIG. 2 is a block diagram showing the clogging degree estimation apparatus and its peripheral components.
FIG. 3 shows an example of an area table.

The clogging degree estimation apparatus and its periphery components of the vehicle on which the engine 1 is mounted will now be described with reference to FIG. 2. FIG. 2 is a block diagram showing the clogging degree estimation apparatus and its peripheral components of the vehicle on which the engine 1 is mounted.

A clogging degree estimation apparatus 400 is an apparatus that estimates a clogging degree of the air cleaner 20. Excess clogging of the air cleaner 20 may deteriorate the performance of the engine 1, damage the engine, or disable the vehicle from traveling. It is thus necessary that the clogging degree estimation apparatus 400 estimates a current clogging degree of the air cleaner 20 with high accuracy. The clogging degree estimation apparatus 400 includes a central processing unit (CPU), a read only memory (ROM) and a random access memory (RAM).

As shown in FIG. 2, the clogging degree estimation apparatus 400 is connected to a car navigation device 202, a time information detector 204, an accelerator opening degree detector 206, an acceleration sensor 208, a travel distance detector 210, and a display 212 in the vehicle on which the air cleaner 20 is mounted.

The car navigation device 202 generates positional information indicating a vehicle's current position based on a signal from a global positioning system (GPS) satellite. The car navigation device 202 also receives a signal indicating traffic congestion information to acquire the traffic congestion information. The traffic congestion information is information in which, for a road which is congested (hereinafter, referred to as a congested road), congested road information for identifying the specific congested road and traffic congestion degree information indicating a degree of traffic congestion of the specific road are associated with each other. The traffic congestion degree information indicates, for example, a "first stage" in which a vehicle's average traveling speed is not greater than a first speed threshold (e.g., 20 km/h) or a "second stage" in which a vehicle's average traveling speed is not greater than a second speed threshold (smaller than the first threshold and, for example, 10 km/h).

The time information detector 204 is configured by a clock and generates time information indicating a current time (including year, month, and day).

The accelerator opening degree detector 206 is an accelerator pedal position sensor that detects an amount for which the driver has pressed down on the accelerator pedal (accelerator opening degree). The accelerator opening degree detector 206 generates accelerator opening degree data indicating variations in the accelerator opening degree over the latest predetermined period (e.g., five minutes).

The acceleration sensor 208 is a three-axis acceleration sensor that detects the respective accelerations in the front and rear direction, lateral direction, and vertical direction of the vehicle. The accelerations detected by the acceleration sensor 208 are used also in, for example, an airbag system. The acceleration sensor 208 generates acceleration data indicating variations in the acceleration in the vertical direction over the last predetermined period (e.g., five minutes).

The travel distance detector 210 detects a travel distance by detecting the rpm of a tire (or the rpm of a drive shaft).

The display 212 notifies a driver of information and includes, for example, an indicator light, a warning light, and a panel.

The clogging degree estimation apparatus 400 includes an information acquisition unit 402, a coefficient determination unit 404, a clogging degree calculator 412, a storage 414, and a notification processor 416.

The information acquisition unit 402 acquires traveling status information indicating a vehicle's traveling status for each travel section. In the present embodiment, the information acquisition unit 402 acquires traveling status information for each unit distance L (e.g., 1 km). The information acquisition unit 402 acquires, as the traveling status information, positional information and traffic congestion information from the car navigation device 202, time information from the time information detector 204, accelerator opening degree data from the accelerator opening degree detector 206, and acceleration data from the acceleration sensor 208.

The coefficient determination unit 404 determines a clogging coefficient K corresponding to a vehicle's traveling status, which is used in calculation of a clogging degree.

During a traffic congestion, a vehicle easily sucks in dust, sand, or exhaust gas swirled up by a vehicle in front because the distance between the vehicles is small, allowing the air cleaner 20 to be contaminated more easily than usual. Also for traveling in an area where the outside air contains a large amount of dust, dirt, or sand, such as in a dessert area or city area, the air cleaner 20 is contaminated more easily than usual. Also for traveling in winter in a cold climate area in which a road de-icing agent (e.g., powdered calcium chloride) is sprayed, the air cleaner 20 is contaminated more easily than usual due to the road de-icing agent. Also for traveling on, for example, an unpaved gravel road, the air cleaner 20 is contaminated more easily than usual due to a dust storm. The coefficient determination unit 404 determines a clogging coefficient K such that this coefficient takes on a greater value when the air cleaner 20 is contaminated more easily. The method of determining a clogging coefficient K by the coefficient determination unit 404 will be described later in detail.

The clogging degree calculator 412 calculates an increase in the clogging degree of the air cleaner 20 due to the travel for the unit distance L (e.g., 1 km), and the storage 414 stores, as a clogging degree, an integrated value of the increase which has been calculated after the installation of a new air cleaner 20. Specifically, the clogging degree calculator 412 calculates an increase in clogging degree for each unit distance L according to Expression (1) below:

$$\text{Increase in Clogging Degree} = L \times K/L \text{ max} \qquad \text{Expression (1)}$$

where K is a clogging coefficient, and Lmax represents a maximum value of a distance (durable distance) with which the air cleaner 20 can be used when a vehicle travels in the standard atmosphere. Lmax is set in advance, for example, by experiment. The clogging degree calculator 412 calculates an increase in clogging degree each time the vehicle has traveled a unit distance L, and adds the calculated increase to the clogging degree stored in the storage 414, thus updating the clogging degree to be stored in the storage 414.

The notification processor 416 compares the clogging degree stored in the storage 414 with a predetermined notification threshold and, when the clogging degree is greater than the notification threshold, displays a notification that the replacement of the air cleaner 20 is recommended on the display 212. For example, when the display 212 includes the display light for the air cleaner 20, the notification processor 416 causes the display light to turn on.

Method of Determining Clogging Coefficient

The method of determining a clogging coefficient K by the coefficient determination unit 404 will now be described. As shown in FIG. 2, the coefficient determination unit 404 includes a first coefficient determination unit 406 that determines a first coefficient k1 corresponding to traffic congestion information, a second coefficient determination unit 408 that determines a second coefficient k2 corresponding to a traveling area, and a third coefficient determination unit 410 that determines a third coefficient k3 corresponding to the condition of the road on which the vehicle travels.

The first coefficient determination unit 406 prestores a table in which the degree of traffic congestion and the value of the first coefficient k1 are associated with each other. In the table, the first coefficient k1 takes on a greater value with a higher degree of traffic congestion. The first coefficient determination unit 406 determines whether the current position indicated by the positional information acquired by the information acquisition unit 402 is located on the congested road indicated by the traffic congestion information acquired by the information acquisition unit 402. When the current position is located on the congested road, the first coefficient determination unit 406 checks the degree of traffic congestion indicated by the traffic congestion degree information corresponding to the congested road information. The first coefficient determination unit 406 determines a first coefficient k1 greater than unity in accordance with the checked degree of traffic congestion. For example, the first coefficient determination unit 406 determines that the first coefficient k1=1.05 when the traffic congestion degree information indicates the "first stage," and determines that the first coefficient k1=1.1 when the traffic congestion degree information indicates the "second stage." The first coefficient determination unit 406 determines that the first coefficient k1=1 when the current position is not located on the congested road.

The second coefficient determination unit 408 prestores an area table in which an area with the air containing a large amount of, for example, dust or sand, an applicable period of time or season, and a value (greater than unity) of the second coefficient k2 are associated with one another.

FIG. 3 shows an example of the area table. In the example shown in FIG. 3, the area table contains a record in which an applicable period "entire period" and a second coefficient k2"1.1" are associated with an "area A," and a record in which an applicable period "entire period" and a second coefficient k2"1.3" are associated with an "area B." Since the "area A" and "area B" are areas with the air containing a large amount of dust, sand, or the like throughout the year, the "entire period" is set as the applicable period. Since the air contains a larger amount of dust, sand, or the like in the "area B" than in the "area A," the value of the second coefficient k2 corresponding to the "area B" is set to be greater than the value of the second coefficient k2 corresponding to the "area A." Further, the area table contains a record in which an applicable period "December through March" and a second coefficient k2"1.2" are associated with an "area C." The "area C" is a cold climate area in which a road de-icing agent is sprayed in winter, and the air contains a larger amount of foreign matter (road de-icing agent) only in winter, and accordingly, the applicable period "December through March" is associated with the "area C."

The second coefficient determination unit 408 identifies a current position using the positional information acquired by the information acquisition unit 402 and also identifies a current time using the time information acquired by the information acquisition unit 402. The second coefficient determination unit 408 checks whether the area table contains a record that satisfies the area to which the current position belongs and the applicable period containing a current time and, when the table contains such a record, determines a value greater than unity as the second coefficient $k2$ in accordance with the record. When the area table does not contain a record that satisfies the area to which the identified current position belongs and the applicable period containing a current time, the second coefficient determination unit 408 determines that the second coefficient $k2=1$.

The third coefficient determination unit 410 determines a third coefficient $k3$ using the acceleration data acquired by the information acquisition unit 402 and the accelerator opening degree data acquired by the information acquisition unit 402.

Figure 4:
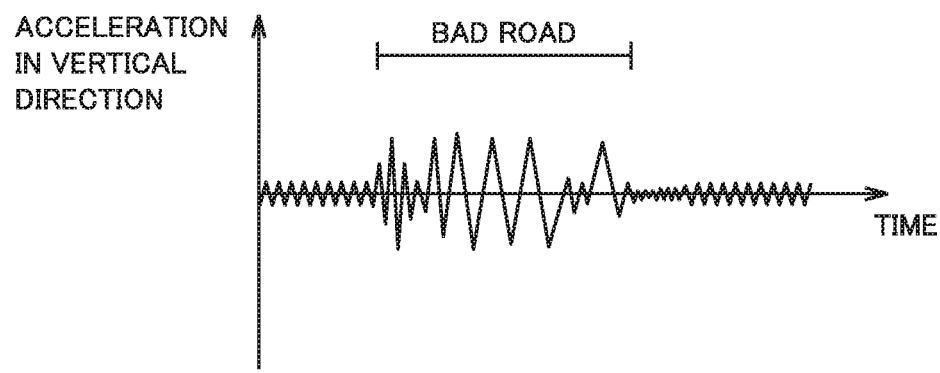
FIG. 4 is a graph showing an example of variations in acceleration.

FIG. 4 is a graph showing an example of variations in acceleration. When traveling on a paved road, the vehicle has smaller variations or vibrations in the vertical direction. In contrast, when traveling on a bad road, which is unpaved, the vehicle vibrates vertically due to unevenness of the road surface. The amplitude of the acceleration in the vertical direction accordingly tends to become higher on the bad road, as shown in FIG. 4.

Figure 5:
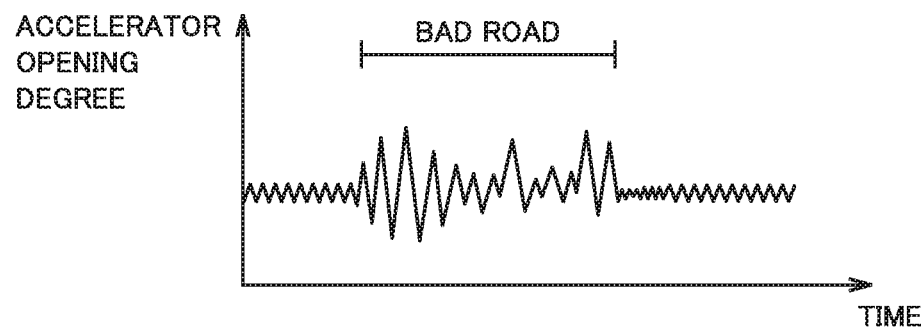
FIG. 5 is a graph showing an example of variations in accelerator opening degree.

FIG. 5 is a graph showing an example of variations in accelerator opening degree. When the vehicle vibrates more greatly, the vibrations of the leg with which the driver presses down on the accelerator pedal tend to become stronger. As shown in FIG. 5, thus, the amplitude of the accelerator opening degree tends to increase on a bad road.

The third coefficient determination unit 410 calculates a first average amplitude of the acceleration data over the last predetermined period (e.g., five minutes) and a second average amplitude of the accelerator opening degree data over the last predetermined period (e.g., five minutes). The third coefficient determination unit 410 determines that the vehicle is traveling on a bad road when the first average amplitude is greater than a first amplitude threshold and the second average amplitude is greater than a second amplitude threshold and determines a third coefficient $k3$ (e.g., 1.1) greater than unity. The third coefficient determination unit 410 may increase the value of the third coefficient $k3$ as the first average amplitude and second average amplitude become greater. The third coefficient determination unit 410 determines that the third coefficient $k3=1$ when the first average amplitude is not greater than the first threshold or the second average amplitude is not greater than the second threshold.

The coefficient determination unit 404 multiplies the thus determined first coefficient $k1$, second coefficient $k2$, and third coefficient $k3$ together, thereby calculating a clogging coefficient $K$.

Processing Flow of Clogging Degree Estimation Apparatus

Figure 6:
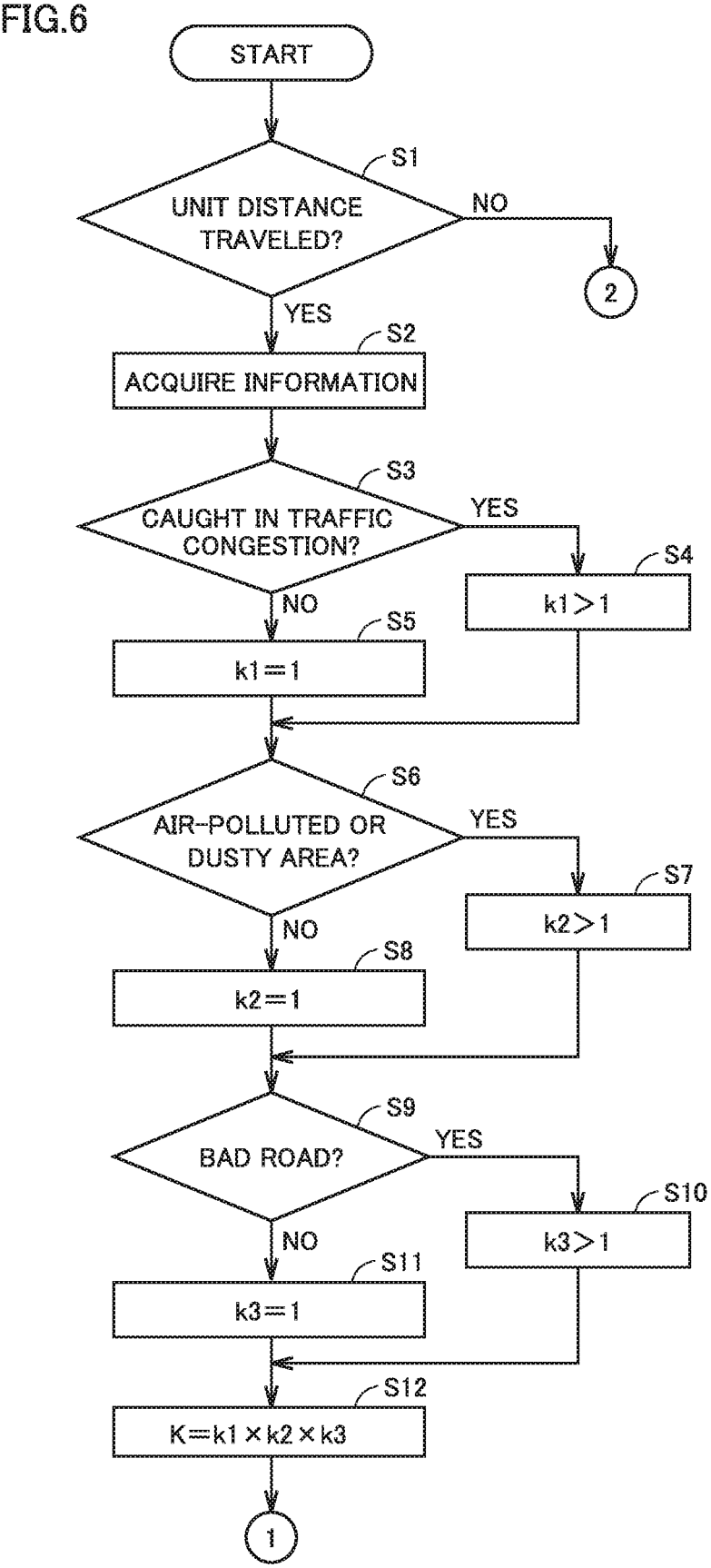
FIG. 6 is a flowchart showing a former stage of a processing flow of the clogging degree estimation apparatus.

The processing flow of the clogging degree estimation apparatus 400 will now be described with reference to FIGS. 6 and 7. FIG. 6 is a flowchart showing the former stage of the processing flow of the clogging degree estimation apparatus 400. FIG. 7 is a flowchart showing the latter stage of the processing flow of the clogging degree estimation apparatus 400.

First, the information acquisition unit 402 determines whether the travel distance detected by the travel distance detector 210 has reached the unit distance L (step S1).

If the travel distance has reached the unit distance L (YES at S1), the information acquisition unit 402 acquires positional information, traffic congestion information, time information, accelerator opening degree data, and acceleration data (step S2).

Then, the first coefficient determination unit 406 determines whether the vehicle is being caught in a traffic congestion (step S3). Specifically, the first coefficient determination unit 406 uses the positional information and traffic congestion information acquired from the car navigation device 202 to determine whether the current position is located within the congested road. The first coefficient determination unit 406 determines that the vehicle is being caught in a traffic congestion when the current position is located within the congested road.

If the vehicle is being caught in a traffic congestion (YES at S3), the first coefficient determination unit 406 determines a value greater than unity that corresponds to the degree of traffic congestion as the first coefficient $k1$ (step S4). If the vehicle is not being caught in a traffic congestion (NO in S3), the first coefficient determination unit 406 determines that the first coefficient $k1=1$ (step S5).

Then, the second coefficient determination unit 408 determines whether the vehicle is traveling in an air-polluted or dusty area (step S6). Specifically, the second coefficient determination unit 408 uses the positional information acquired from the car navigation device 202 and the time information acquired from the time information detector 204 to determine whether the area table contains a record corresponding to the current position and current time. If the area table contains a record corresponding to the current position and current time, the second coefficient determination unit 408 determines that the vehicle is traveling in an air-polluted area.

If the vehicle is traveling in an air-polluted area (YES at S6), the second coefficient determination unit 408 determines a value greater than unity as the second coefficient $k2$ in accordance with the record corresponding to the current position and current time (step S7). If the vehicle is not traveling in an air-polluted area (NO at S6), the second coefficient determination unit 408 determines that the second coefficient $k2=1$ (step S8).

Then, the third coefficient determination unit 410 determines whether the road on which the vehicle is traveling is a bad road (step S9). Specifically, if the first average amplitude in the accelerator opening degree data is greater than the first amplitude threshold and the second average amplitude in the acceleration data is greater than the second amplitude threshold, the third coefficient determination unit 410 determines that the road on which the vehicle is traveling is a bad road.

If the road on which the vehicle is traveling is a bad road (YES at S9), the third coefficient determination unit 410 determines a value greater than unity (e.g., 1.1) as a third coefficient $k3$ (step S10). If the road on which the vehicle is traveling is not a bad road (NO at S9), the third coefficient determination unit 410 determines that the third coefficient $k3=1$ (step S11).

The coefficient determination unit 404 multiplies the determined first coefficient $k1$, second coefficient $k2$, and third coefficient $k3$ together to calculate a clogging coefficient $K$ (step S12).

As shown in FIG. 7, then, the clogging degree calculator 412 calculates an increase in the clogging degree in the latest unit distance L in accordance with the above Expression (1) (increase in clogging degree=$L \times K/Lmax$) (step S13). The clogging degree calculator 412 adds the calculated increase to the clogging degree stored by the storage 414, thus updating the clogging degree (step S14).

The notification processor 416 compares the updated clogging degree with a notification threshold (step S15) and, if the clogging degree is greater than the notification threshold (YES at S15), notifies on the display 212 that the replacement of the air cleaner 20 is recommended (step S16). Then, a travel distance to be detected by the travel distance detector 210 is reset to zero (step S17), and the process returns to step S1. Also if the clogging degree is not greater than the notification threshold (NO at S15), the travel distance is reset to zero (step S17), and the process returns to step S1. Also when the travel distance has not reached the unit distance L at step S1 (NO at S1), the process returns to step S1.

Modifications

The coefficient determination unit 404 determines a clogging coefficient K for each unit distance L in the description above. However, the coefficient determination unit 404 may determine a clogging coefficient K for each section traveled by the vehicle in a unit time (e.g., one minute). In this case, it suffices that the clogging degree calculator 412 calculates an increase in clogging degree in a unit time:

$$\text{Increase in Clogging Degree} = Ls \times K/L \max \quad \text{Expression (2)}$$

where $Ls$ represents the distance traveled by the vehicle in a unit time.

The clogging degree calculator 412 may calculate, for each section from a start of the engine 1 by an operation of turning on an ignition switch until a stop of the engine 1 by an operation of turning off the ignition switch, an increase in the clogging degree of the air cleaner 20 in the section. Alternatively, for each section from a start to a stop of the engine 1 (including a stop of the engine while the vehicle stops through idling stop), the clogging degree calculator 412 may calculate an increase in the clogging degree of the air cleaner 20 in the section.

In this case, the information acquisition unit 402 acquires positional information and traffic congestion information in the section from a start to a stop of the engine 1 from the car navigation device 202. The first coefficient determination unit 406 calculates first coefficients k1 for respective points of time within the section similarly to the above and calculates an average thereof. The information acquisition unit 402 acquires the positional information and time information in the section respectively from the car navigation device 202 and the time information detector 204. The second coefficient determination unit 408 calculates second coefficients k2 for respective points of time during the section similarly to the above and calculates an average thereof. The information acquisition unit 402 acquires the acceleration data and accelerator opening degree data within the section respectively from the acceleration sensor 208 and the accelerator opening degree detector 206. The third coefficient determination unit 410 calculates third coefficients k3 for respective points of time in the section similarly to the above and calculates an average thereof. The coefficient determination unit 404 determines the product of the average value of the first coefficients k1, the average value of the second coefficients k2, and the average value of the third coefficients k3 during a section as a clogging coefficient K in this section. It suffices that the clogging degree calculator 412 calculates an increase in clogging degree in each section in accordance with Expression (3) below:

$$\text{Increase in Clogging Degree} = Lt \times K/L \max \quad \text{Expression (3)}$$

where $Lt$ represents a travel distance from a start to a stop of the engine 1.

Alternatively, the clogging degree calculator 412 may calculate, for each section from a vehicle's start from a specific location (e.g., a parking lot of the vehicle) to a return to the specific location, an increase in the clogging degree of the air cleaner 20 in the section.

In the description above, the third coefficient determination unit 410 determines that the road on which the vehicle is traveling is a bad rod when the first average amplitude of the accelerator opening degree is greater than the first amplitude threshold and the second average amplitude of the acceleration is greater than the second amplitude threshold, and determines a value greater than unity as the third coefficient k3. However, the third coefficient determination unit 410 may determine a value greater than unity as the third coefficient k3 when the first average amplitude of the accelerator opening degree is greater than the first amplitude threshold or when the second average amplitude of the acceleration is greater than the second amplitude threshold.

In the description above, the coefficient determination unit 404 includes the first coefficient determination unit 406, second coefficient determination unit 408, and third coefficient determination unit 410. However, it suffices that the coefficient determination unit 404 includes at least one of the first coefficient determination unit 406, second coefficient determination unit 408, and third coefficient determination unit 410.

For example, when the coefficient determination unit 404 includes the first coefficient determination unit 406 alone, the coefficient determination unit 404 determines the first coefficient k1 as the clogging coefficient K. When the coefficient determination unit 404 includes the second coefficient determination unit 408 alone, the coefficient determination unit 404 determines the second coefficient k2 as the clogging coefficient K. When the coefficient determination unit 404 includes the third coefficient determination unit 410 alone, the coefficient determination unit 404 determines the third coefficient k3 as the clogging coefficient K.

When the coefficient determination unit 404 includes the first coefficient determination unit 406 and second coefficient determination unit 408, the coefficient determination unit 404 determines the product (k1×k2) of the first coefficient k1 and second coefficient k2 as the clogging coefficient K. When the coefficient determination unit 404 includes the first coefficient determination unit 406 and third coefficient determination unit 410, the coefficient determination unit 404 determines the product (k1×k3) of the first coefficient k1 and third coefficient k3 as the clogging coefficient K. When the coefficient determination unit 404 includes the second coefficient determination unit 408 and third coefficient determination unit 410, the coefficient determination unit 404 determines the product (k2×k3) of the second coefficient k2 and third coefficient k3 as the clogging coefficient K.

The air cleaner 20 whose clogging degree is estimated by the clogging degree estimation apparatus 400 according to the present embodiment can be mounted on a normal vehicle including an engine alone or a hybrid vehicle including two power sources, namely, an engine and an electric motor.

Advantages

As described above, the clogging degree estimation apparatus 400 according to the present embodiment includes the information acquisition unit 402 that acquires information indicating a vehicle's traveling status for each travel section, the coefficient determination unit 404 that determines a clogging coefficient K based on the traveling status indicated by the information for each travel section, and the clogging degree calculator 412 that calculates an increase in clogging degree based on the product of the clogging coefficient K and the distance of the travel section for each travel section and calculates, as the clogging degree, an integrated value of the increase calculated for each travel section.

The predetermined travel section may be a section in which the vehicle travels a unit distance, a section in which the vehicle has traveled in a unit time, or a section from a start to a stop of the engine 1.

The configuration described above allows the determination of a clogging coefficient K in consideration of a vehicle's traveling status, enabling an accurate estimation of a clogging degree of the air cleaner 20.

For example, the information acquisition unit 402 acquires positional information indicating a vehicle's position and traffic congestion information indicating a congested road. The first coefficient determination unit 406 determines a value greater than unity as the first coefficient k1 when the current position indicated by the positional information is located on the congested road indicated by the traffic congestion information. The clogging coefficient K determined by the coefficient determination unit 404 is thus greater than unity.

When the road is congested, the vehicle easily sucks in the dust, sand, exhaust gas, or the like swirled up by the vehicle in front, and accordingly, the air cleaner 20 is polluted more easily than usual. The above configuration allows the determination of a clogging coefficient K having a value greater than unity when the vehicle is located on the congested road, thus enabling an accurate estimation of the clogging degree of the air cleaner 20.

The second coefficient determination unit 408 determines a value greater than unity as the second coefficient k2 when the current position indicated by the positional information is within a predetermined area. The clogging coefficient K determined by the coefficient determination unit 404 is thus greater than unity.

When the vehicle travels in an area with the air containing a large amount of dust, dirt, sand, or the like, such as in a dessert area or a city area, the air cleaner 20 is polluted more easily than usual. The above configuration allows the determination of the clogging coefficient K having a value greater than unity when the vehicle travels in such an area. This enables an accurate estimation of the clogging degree of the air cleaner 20 in accordance with a vehicle's traveling status.

Alternatively, the information acquisition unit 402 may acquire positional information indicating a vehicle's position and time information indicating a time. The second coefficient determination unit 408 determines a value greater than unity as the second coefficient k2 when the current position indicated by the positional information is within a predetermined area and the time indicated by the time information is within a predetermined period. The clogging coefficient K determined by the coefficient determination unit 404 is thus greater than unity.

When a vehicle travels in a cold climate area in winter in which a road de-icing agent (e.g., powdered calcium chloride) is sprayed, the air cleaner 20 is polluted by the road de-icing agent more easily than usual. The above configuration allows the determination of a clogging coefficient K greater than unity for traveling in such an area in winter. This enables an accurate estimation of the clogging degree of the air cleaner 20 in accordance with a vehicle's traveling status.

The information acquisition unit 402 may acquire acceleration data indicating variations in acceleration in the vertical direction of the vehicle. The third coefficient determination unit 410 determines a value greater than unity as the third coefficient k3 when the first average amplitude of the acceleration data is greater than the first amplitude threshold. The clogging coefficient K determined by the coefficient determination unit 404 is thus greater than unity.

Alternatively, the information acquisition unit 402 may acquire accelerator opening degree data indicating variations in accelerator opening degree of the vehicle. The third coefficient determination unit 410 determines a value greater than unity as the third coefficient k3 when the second average amplitude in the accelerator opening degree data is greater than the second amplitude threshold. The clogging coefficient K determined by the coefficient determination unit 404 is thus greater than unity.

Alternatively, the third coefficient determination unit 410 determines a value greater than unity as the third coefficient k3 when the first average amplitude of the acceleration data is greater than the first amplitude threshold and the second average amplitude in the accelerator opening degree data is greater than the second amplitude threshold. The clogging coefficient K determined by the coefficient determination unit 404 is thus greater than unity.

When a vehicle travels on a bad road such as an unpaved gravel road, the air cleaner 20 is polluted by a dust storm more easily than usual. When the vehicle travels on a bad road, the acceleration in the vertical direction varies more greatly, and also, the accelerator opening degree varies more easily. The above configuration allows the determination of a clogging coefficient K having a value greater than unity when the vehicle travels on a bad road. This enables an accurate estimation of the clogging degree of the air cleaner 20 in accordance with a vehicle's traveling status.

The coefficient determination unit 404 calculates the product of the first coefficient k1, second coefficient k2, and third coefficient k3 as the clogging coefficient K. This enables an accurate estimation of the clogging degree of the air cleaner 20 in accordance with the condition of traffic congestion, the area, and the condition of the road.

The clogging degree estimation apparatus 400 further includes the notification processor 416 that provides a notification that the replacement of the air cleaner 20 is recommended when the clogging degree is greater than the notification threshold. This allows the driver to replace the air cleaner 20 at appropriate timing.

Although the embodiment of the present invention has been described and illustrated in detail, it is clearly understood that the same is illustrative and non-restrictive in any respect. The scope of the present invention is defined by the terms of the claims, and is intended to include any modifications within the scope and meaning equivalent to the terms of the claims.

What is claimed is:

1. A clogging degree estimation apparatus that estimates a clogging degree of an air cleaner mounted on a vehicle, the apparatus comprising:
   an information acquisition unit configured to acquire information indicating a traveling status of the vehicle for each of predetermined travel sections;
   a coefficient determination unit configured to determine a clogging coefficient based on the traveling status indicated by the information for each of the predetermined travel sections; and
   a clogging degree calculator configured to calculate an increase in the clogging degree based on a product of the clogging coefficient and a distance of each of the predetermined travel sections and calculate, as the clogging degree, an integrated value of the increase calculated for each of the predetermined travel sections, the information acquisition acquiring information indicating whether the vehicle travels on an unpaved road.

2. The clogging degree estimation apparatus according to claim 1, wherein the information acquisition unit acquires positional information indicating a position of the vehicle and traffic congestion information indicating a congested road, and the coefficient determination unit determines a value greater than unity as the clogging coefficient when the position indicated by the positional information is on the congested road indicated by the traffic congestion information.

3. The clogging degree estimation apparatus according to claim 1, wherein the information acquisition unit acquires positional information indicating a position of the vehicle, and the coefficient determination unit determines a value greater than unity as the clogging coefficient when the position indicated by the positional information is within a predetermined area.

4. The clogging degree estimation apparatus according to claim 1, wherein the information acquisition unit acquires positional information indicating a position of the vehicle and time information indicating a time, and the coefficient determination unit determines a value greater than unity as the clogging coefficient when the position indicated by the positional information is within a predetermined area and the time indicated by the time information is within a predetermined period.

5. The clogging degree estimation apparatus according to claim 1, wherein the information acquisition unit acquires acceleration data indicating variations in acceleration in a vertical direction of the vehicle, and the coefficient determination unit determines a value greater than unity as the clogging coefficient when an amplitude in the acceleration data is greater than an amplitude threshold.

6. The clogging degree estimation apparatus according to claim 1, wherein the information acquisition unit acquires accelerator opening degree data indicating variations in accelerator opening degree of the vehicle, and the coefficient determination unit determines a value greater than unity as the clogging coefficient when an amplitude in the accelerator opening degree data is greater than an amplitude threshold.

7. The clogging degree estimation apparatus according to claim 1, wherein the information acquisition unit acquires acceleration data indicating variations in acceleration in a vertical direction of the vehicle and accelerator opening degree data indicating variations in accelerator opening degree of the vehicle, and the coefficient determination unit determines a value greater than unity as the clogging coefficient when an amplitude in the acceleration data is greater than a first amplitude threshold and an amplitude in the accelerator opening degree data is greater than a second amplitude threshold.

8. The clogging degree estimation apparatus according to claim 1, wherein the information acquisition unit acquires positional information indicating a position of the vehicle, traffic congestion information indicating a congested road, time information indicating a time, acceleration data indicating variations in acceleration in a vertical direction of the vehicle, and accelerator opening degree data indicating variations in accelerator opening degree of the vehicle, the coefficient determination unit includes a first coefficient determination unit configured to determine a value greater than unity as a first coefficient when a first condition is satisfied and determine unity as the first coefficient when the first condition is not satisfied, the first condition being a condition that the position indicated by the positional information is on the congested road indicated by the traffic congestion information, a second coefficient determination unit configured to determine a value greater than unity as a second coefficient when a second condition or a third condition is satisfied and determine unity as the second coefficient when neither the second condition nor the third condition is satisfied, the second condition being a condition that the position indicated by the positional information is within a first predetermined area, the third condition being a condition that the position indicated by the positional information is within a second predetermined area and the time indicated by the time information is within a predetermined period, and a third coefficient determination unit configured to determine a value greater than unity as a third coefficient when a fourth condition is satisfied and determine unity as the third coefficient when the fourth condition is not satisfied, the fourth condition being a condition that an amplitude in the acceleration data is greater than a first amplitude threshold and an amplitude in the accelerator opening degree data is greater than a second amplitude threshold, and the coefficient determination unit calculates a product of the first coefficient, the second coefficient, and the third coefficient as the clogging coefficient.

9. The clogging degree estimation apparatus according to claim 1, wherein the predetermined travel section is a section in which the vehicle travels a unit distance.

10. The clogging degree estimation apparatus according to claim 1, wherein the predetermined travel section is a section in which the vehicle travels in a unit time.

11. The clogging degree estimation apparatus according to claim 1, wherein the predetermined travel section is a section from a start to a stop of an engine of the vehicle.

12. The clogging degree estimation apparatus according to claim 1, further comprising a notification processor configured to provide a notification that replacement of the air cleaner is recommended when the clogging degree is greater than a notification threshold.

* * * * *